Patented Feb. 12, 1935

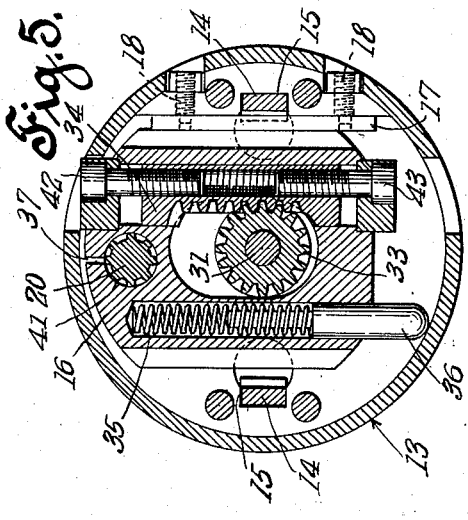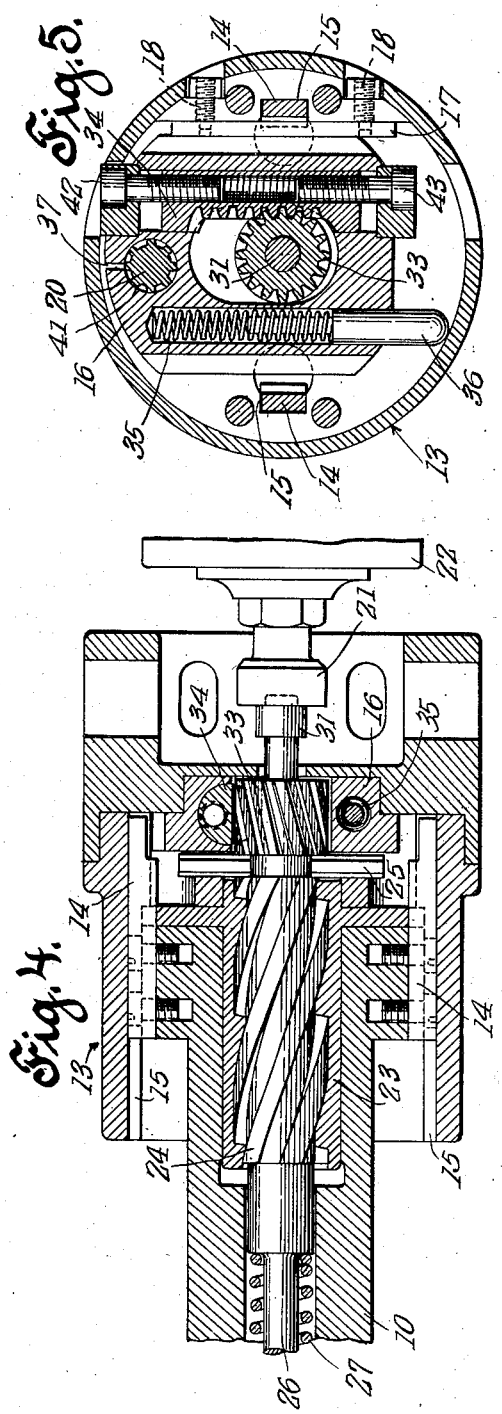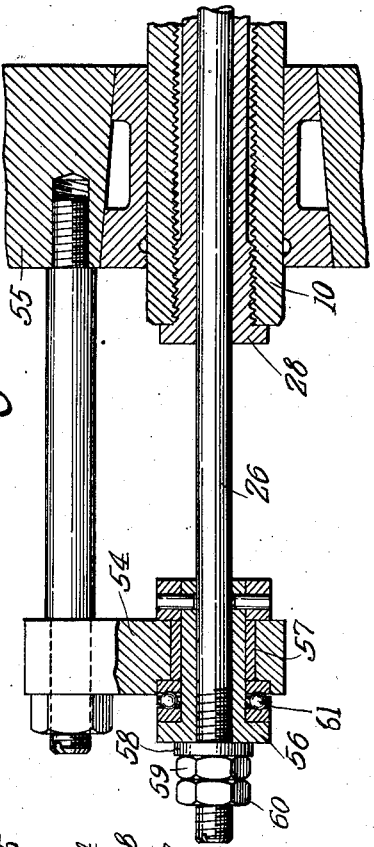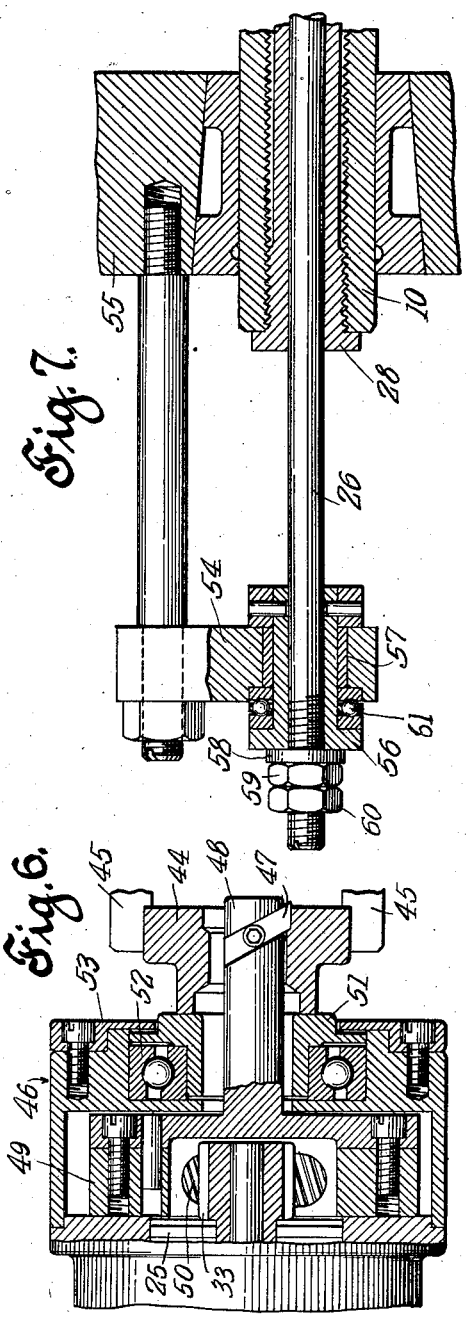

1,990,724

UNITED STATES PATENT OFFICE 1,990,724

ROTARY CROSS CUT TOOL

Robert S. Brown, New Britain, Conn., assignor to The New Britain-Gridley Machine Company, New Britain, Conn., a corporation of Connecticut Application October 31, 1930, Serial No. 492,393

15 Claims. (Cl. 82—1)

My invention relates to a cross cut tool for use with machine tools.

The machine tools with which my invention is intended to be used embrace all types in which a tool and spindle are relatively rotated. My invention is very effective when used on a multiple spindle automatic chucking machine having an indexing turret. In the drawings I have illustrated my invention as applied to a machine tool in which the spindle is given an axial feed, but the invention is equally useful with a machine in which the work is fed axially.

It is the principal object of the present invention to provide improved means for necking, undercutting, and recessing. Further objects are to provide improved pilot means for initiating the radial motion of the cutter, and to provide a tool which will be rigidly secured and capable of exact adjustment. Other objects and features of the invention will be pointed out or will become apparent upon a reading of the specification.

Briefly stated, in a preferred form I employ a rotary cross feeding cutter head in which the cross feed of the cutter is effected by the relative rotation of two interengaging parts which is produced when one of these parts is moved axially relatively to the other. The axial feed of either the work or the spindle carrying the cutter, together with means for holding the other of these parts against axial motion, are utilized to produce relative axial motion of the two interengaging parts. Spring means may also be provided which will automatically move the cutter radially to its inoperative position when the cutter and the work are axially separated at the completion of a cross cut.

In the drawings which show, for illustrative purposes only, a preferred form of the invention—

Fig. 3 is an end view of the front end of the tool;

Fig. 4 is a central sectional view taken upon the plane of the line 4—4 in Fig. 2, parts being shown in plan, and parts being shown in different operative position from that shown in Fig. 2;

Fig. 5 is a transverse section taken upon the plane of the line 5—5 in Fig. 2;

Fig. 6 is a partial central sectional view of a modification;

Fig. 7 is a central sectional view of a modified form of the rear end of the tool.

Figures 1, 2:
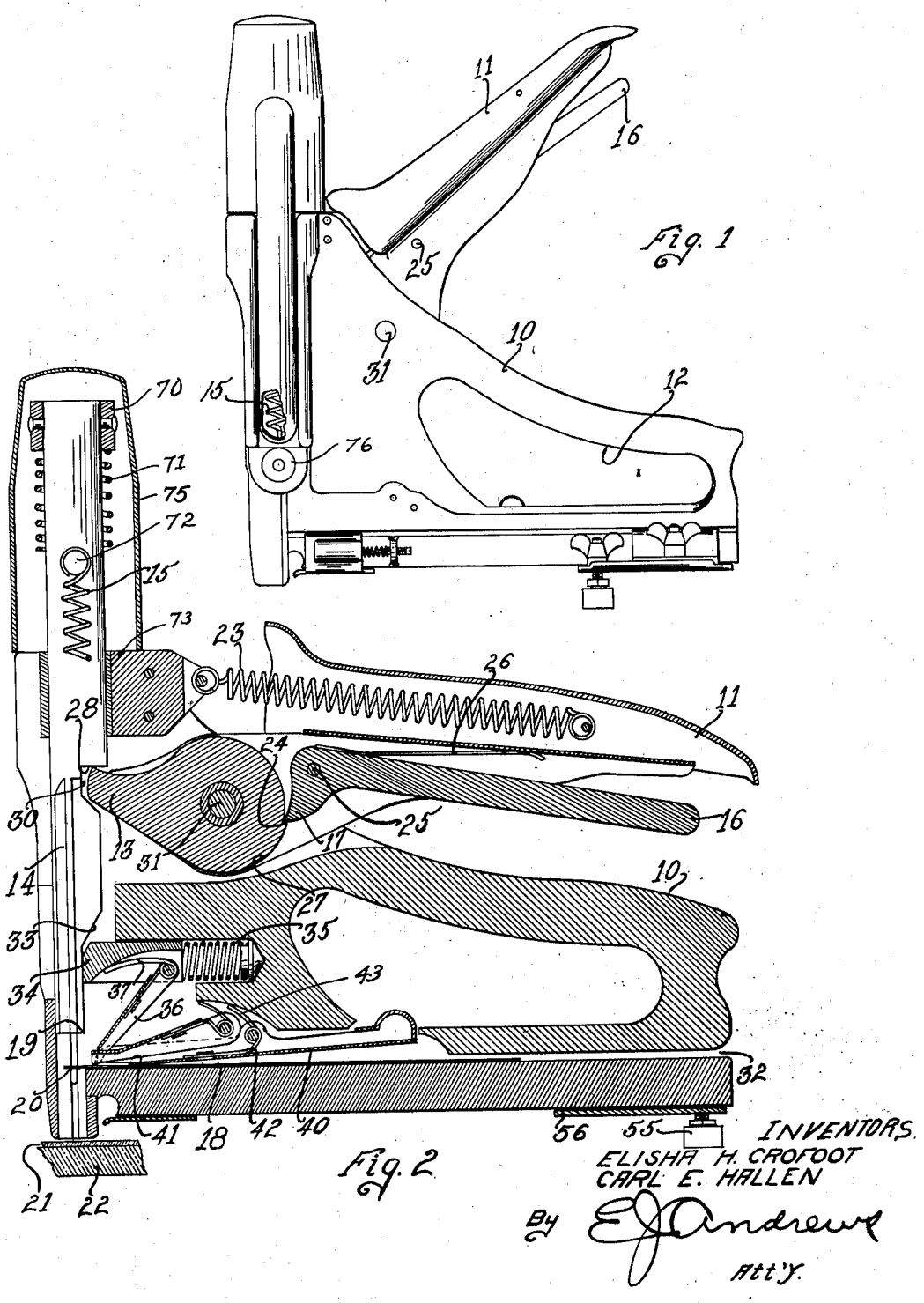
Fig. 1 is a central sectional view of a rotary cross cut tool embodying features of my invention, parts being shown in elevation.
Fig. 2 is an enlarged sectional view of the principal parts of the tool, taken upon the plane of the line 2—2 in Fig. 3.

In said illustrative drawings, 10 represents a spindle of a machine tool of the tool rotating type, such as an automatic chucking machine. 11 is a gear connected to the spindle to impart rotation to the spindle. The spindle is moved axially by means of a collar 12 which is interposed between the gear 11 and a nut 12ª which is threaded to the spindle 10. The collar 12 is operated by cam means which are not shown in the drawings. 13 is a cross cut head which is preferably made in two parts which are bolted together in any convenient manner. In the form shown in the drawings, this head is so arranged with respect to the spindle 10 that the head can move axially relatively to the spindle, but cannot rotate with respect thereto. This effect is obtained by providing the spindle with keys 14 which cooperate with longitudinal keyways 15 in the head 13. 16 is a slide mounted on transverse guides in the head 13 so as to be radially movable relative to the axis of the spindle 10 by means which will presently be described. 17 is a slide gib which is adjustable by means of screws 18. Mounted on the slide 16 is a cutter 19 having a shank 20. The cutter rotates with the spindle 10 about the axis of the spindle and is moved radially to the spindle by means of the slide 16. 21 is a work piece which is not rotated and which is held in a suitable chuck or holding device 22.

In order to move the slide 16 and the cutter 19 radially relative to the axis of the spindle 10, I provide two relatively rotatable interengaging parts, one of which is connected to the spindle 10 and the other of which is connected to the head 13. In a preferred form of my invention shown in the drawings these interengaging parts are screw threaded. The connection between one of these parts and the part to which it is connected is a rigid connection; the connection between the other and the part to which it is connected is such as to permit relative rotation but not relative axial movement. In the form shown in the drawings, a nut 23 is rigidly connected to the spindle 10, and an operating screw 24 is connected to the head 13. The screw 24 can rotate relatively to the head 13, but is held against axial movement relative thereto by means of a thrust washer 25. This thrust washer fits into a circumferential groove in the screw 24 and is rigidly attached to the head 13 in any suitable manner as by screws. The washer is preferably made in one piece and then broken apart in orthe front of the spindle 10 when the means shown in Fig. 7 are employed.

While the invention has been described in considerable detail and a specific form has been shown in the drawings, it is to be understood that the construction may be otherwise embodied and employed in connection with cross cut tools of various types other than that herein shown.

I claim:

1. A cross cut tool for machine tools comprising, a head, a spindle, said spindle and said head being held against relative rotation, a pair of interengaging screw threaded members, one of said threaded members being connected to said head and held against axial movement relative thereto, the other of said threaded members being connected to said spindle and held against axial movement relative thereto, one of said threaded members being rotatable relative to the part to which it is connected, the other of said threaded members being non-rotatable relative to the part to which it is connected, a cutter mounted on said head, means for causing relative movement of said threaded members, and means whereby relative movement of said threaded members will move said cutter radially of said head.

2. A cross cut tool for machine tools comprising, a head, a pair of interengaging screw threaded members, said head being rotatable relative to one of said threaded members and being non-rotatable relative to the other of said threaded members, means for causing relative rotation of said threaded members, a pinion rotatable by one of said threaded members, a slide in said head movable transversely to said head, a rack connected to said slide and engaged by said pinion, and a cutter mounted on said slide, said rack being adjustable longitudinally to said slide.

3. A cross cut tool for machine tools comprising, a head, a cutter mounted on said head, a pair of interengaging screw threaded members, said head being rotatable relative to one of said threaded members and being non-rotatable relative to the other of said threaded members, and a spring for moving said threaded members relatively to each other, whereby when said head is moved axially away from a work piece said spring will operate to move said cutter radially away from the axis of rotation of said head.

4. A cross cut tool for machine tools comprising, a head, a cutter mounted on said head, a pair of interengaging screw threaded members, said head being rotatable relative to one of said threaded members and being non-rotatable relative to the other of said threaded members, a spring for moving said threaded members relatively to each other, a pilot member for cooperating with a work piece and operating to hold one of said threaded members against axial motion, and means whereby relative motion of said threaded members will move said cutter radially of said head.

5. A cross cut tool for machine tools comprising, a head, a spindle, said spindle and said head being held against relative rotation, a nut rigidly attached to said spindle, a screw engaging with said nut and connected to said head, said screw being rotatable relative to said head but held against axial movement relative thereto, a cutter mounted on said head, means for causing relative movement of said nut and said screw, and means whereby axial movement of said spindle will move said cutter radially of said head.

6. A cross cut tool for machine tools comprising, a head, a spindle, said spindle and said head being held against relative rotation, a nut rigidly attached to said spindle, a screw engaging with said nut and connected to said head, said screw being rotatable relative to said head but held against axial movement relative thereto, a pinion rotatable with said screw, a spring interposed between said spindle and said screw, a pilot member for cooperating with a work piece and operating to hold said screw against axial motion, a slide in said head movable transversely to said head, a rack connected to said slide and engaged by said pinion, a cutter mounted on said slide, whereby the cooperation of said pilot member with a work piece will operate to cause said cutter to move radially of said head.

7. A cross cut tool for machine tools comprising, a head, a pinion rotatably mounted in said head, means to rotate said pinion relatively to said head, a slide in said head movable transversely to said head, a rack connected to said slide and engaged by said pinion, and a cutter mounted on said slide, said rack being adjustable longitudinally to said slide.

8. A cross cut tool for machine tools comprising, a head, a cutter mounted on said head, pilot means cooperating with a work piece, an anti-friction bearing for supporting said pilot means, and means whereby the motion of said cutter relative to said head will be controlled by the cooperation of said pilot means with a work piece.

9. A cross cut tool for machine tools comprising, a rotatable head, a cutter mounted on said head, a hollow pilot member coaxially mounted in said head for cooperating with a work piece, an anti-friction bearing interposed between said pilot member and said head, a cover plate to hold said pilot member in place in said head, and means whereby the motion of said cutter relative to said head will be controlled by the cooperation of said pilot member with a work piece.

10. A cross cut tool for machine tools comprising, a cutter, a spindle, a bearing support, a rod having adjustable stop means for limiting the axial motion of said rod relative to said bearing support, a sleeve within said bearing support, an anti-friction thrust bearing between said support and said sleeve, said sleeve being rotatable relative to said bearing support and being held against axial motion relative thereto, said rod passing through said sleeve and being axially movable relative thereto, and means whereby the motion of said cutter relative to said spindle will be controlled by the cooperation of said rod and said bearing support.

11. A cross cut tool for machine tools, comprising, a head, a cutter mounted on said head, a pair of interengaging screw threaded members, said head being rotatable relative to one of said threaded members and being non-rotatable relative to the other of said threaded members, a pilot member for cooperating with a work piece and operating to hold one of said threaded members against axial motion, and means whereby relative motion of said threaded members will move said cutter radially of said head.

12. A cross cut tool comprising a head, a tool carried thereby, a pilot means, said head and pilot means having interengaging coaxially mounted means to cause relative rotation between said head and pilot means upon relative longitudinal movement of a part of said head and pilot means, and means for causing a transverse movement of said tool upon said relative rotative movement between said head and pilot means caused by said longitudinal movement.

13. A cross cut tool comprising a head, a pilot means rotatably carried thereby and held against relative axial movement thereon, a member slidable but not rotatable on said head, means between said member and pilot means for causing relative rotation between said pilot means and member upon relative longitudinal movement between said member and pilot means, a tool carried by said head, and means for causing transverse movement of said tool on said head upon said relative rotation of said pilot means and member.

14. A cross cut tool comprising a pair of coaxial relatively movable members, said members having means for causing relative rotation upon relative axial movement of said members, a tool head carrying a tool, said head being movable axially and held against rotation relatively to one of said members, said head being rotatable but held against axial movement relatively to the other of said members, and means for causing said tool to move transversely on said head upon said relative rotative movement of said members.

15. A machine frame, a cross cut tool comprising a pair of relatively axially movable members, a tool, means for moving said tool transversely upon relative axial movement of said members to cause said tool to engage a work piece, means for moving said members unitarily, and fixed abutment means carried by said machine frame, a rearward axial extension on one of said members to engage said abutment means to arrest the movement of said one of said members while permitting the movement of the other to continue so as to effect transverse movement of the tool.

ROBERT S. BROWN.

Feb. 12, 1935.　　E. H. CROFOOT ET AL　　1,990,725

TACKER

Filed June 3, 1932　　2 Sheets-Sheet 1

INVENTORS.
ELISHA H. CROFOOT
CARL E. HALLEN
By E. J. Andrews
Att'y.